Figure 1:
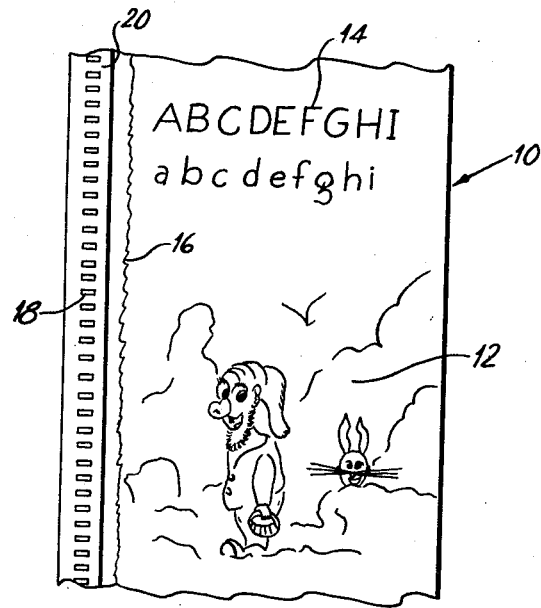

April 17, 1962 S. ZAROMB 3,029,683
AUDIO-VISUAL DEVICE
Filed Aug. 13, 1958

INVENTOR.
SOLOMON ZAROMB
BY
ATTORNEY

United States Patent Office 3,029,683
Patented Apr. 17, 1962

3,029,683
AUDIO-VISUAL DEVICE
Solomon Zaromb, 5603 Hilltop Ave., Philadelphia, Pa.
Filed Aug. 13, 1958, Ser. No. 754,851
7 Claims. (Cl. 88—16.2)

This invention relates to educational devices and more particularly to educational devices of the audio-visual class.

Devices are known which constitute, for example, audio-visual educational training aids for retarded children and pre-school children and, in some instances, for adults studying foreign languages. These devices incorporate means for viewing pictures and related texts with means for presenting audio information associated with the pictures and text. One such approach involves conventional motion picture systems with sound attachments. These systems are, however, complex and expensive. They are therefore most efficiently used in conjunction with mass audiences.

Other such systems incorporate the sequential mechanical presentation of printed pictures and text with the accompaniment of a phonograph record. These systems are difficult to synchronize. Furthermore, these devices must be re-started after each complete passage through the material.

It is an object of the invention to provide an improved training aid.

It is another object of the invention to provide an improved audio-visual training aid that is relatively inexpensive.

It is a further object of the invention to provide an improved audio-visual training aid having a built-in synchronization between the audio and visual information.

It is yet another object of the invention to provide an audio-visual training aid wherein the material is presented in repeated cycles so that it may be operated unattended.

It is another object of the invention to provide an audiovisual system in which the information to be presented is stored in means which is small in relative contrast to the amount of information involved.

Briefly, in accordance with one embodiment of the invention, audio-visual apparatus is provided which includes an endless band containing visual information. Longitudinally disposed near one edge of the endless band is a track of recorded indicia. A transducer is operatively disposed with respect to the track for converting the recorded indicia ot audibly sensible information. Means are further provided for moving the endless band and its associated track past the transducer. Preferably, the band is provided in such a manner that it has an "idle" condition and an active condition or condition of use, a section of the band in idle condition occupying a space which is small relative to that in its active condition.

Other objects, and the features and advantages of the invention will be pointed out in the following detailed description and illustrated in the accompanying drawings which disclose, by way of example, the principles of the invention and the best mode which has been contemplated for carrying out these principles.

Figure 2:
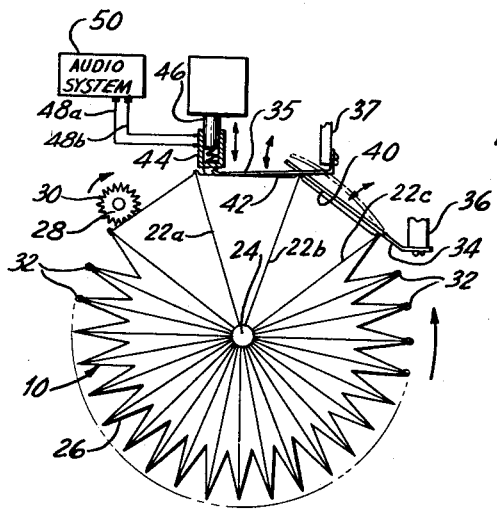

In the drawings:

FIGURE 1 is a schematic side view of an audio-visual educational device in accordance with a preferred embodiment of the invention; and FIGURE 2 is a portion of the endless band of the audio-visual educational device of FIG. 1.

Referring to FIGS. 1 and 2, audio-visual apparatus is shown which includes a pleated endless band 10 (which may be of one or more joined sections) of a flexible material such as paper or plastic which constitutes a base for information such as a picture 12 and associated text 14. Along a border of the picture 12 is a magnetic track 16 the information of which is related to the text 14. The magnetic track 16 may be a deposited layer of commercially available iron oxides or a length of conventional magnetic tape. The text 14 preferably describes the picture 12 and is, as well, recorded on magnetic track 16 for audio reproduction to provide an automatic synchronization of the visual and audio information. A series of equidistant slots or holes 18 are disposed along one edge 20 of the endless band 10. If paper is used for the endless band 10, a reinforcing material may be employed along the edge 20.

The endless band 10 is mounted on a plurality of hinged support members 22 which radially extend from a rotatable axis member or axle 24. Hinged support members 22 are of equal length and angularly disposed about the axis member 24. The endless band 10 has a plurality of accordion-like folds 26 with each of the folds extending radially inward between pairs of adjacent support members 22.

Rotary movement is imparted to the endless band 10 and the hinged support members 22 by a toothed wheel 28 driven by a rotary source of power (not shown). The rotary source of power may be a constant speed electric motor and reduction gear system which insures a tangential velocity of movement of the endless band 10 of about, for example, two inches per second. Thus, as toothed wheel 28 rotates, its teeth 30 engage corresponding holes 18 causing the rotation of the endless belt 10 and the hinged support members 22 about the axis member 24.

As the assembly rotates, the tips 32 of the hinged support members 22 are sequentially engaged of leaf spring 34 and a forked leaf spring 35 which retard tips 32 to insure the display or unfolding under tension of at least three folds 26. In particular, the leaf spring 34 extends from a support 36 to the crotch portion of forked leaf spring 35. The leaf spring 34 assumes a position at the perimeter of the arc swept by the tip 32 so that a constant retarding force is exerted on the hinged support members (member 22c as shown) during its rotation toward forked leaf spring 35. Forked leaf spring 35 extending from support 37 is biased against the tips 32 and also maintains a retarding force until the hinged support member 22b (as shown) is in the region of magnetic reproducing head 44.

The portion of the endless band 10 suceptible to viewing at any one time is designated by the reference character 42. A magnetic reproducing head 44 is positioned above the associated portion 42 of the megnetic track 16. It should be noted that the magnetic head 44 is biased against the endless band 10 in the region of the magnetic track 16 by a spring member 46.

Coupled to the magnetic reproducing head 44 via leads 48 is an audio system 50. Audio system 50 may comprise conventional preamplifiers, amplifiers and speakers. A continuous or intermittent light source (not shown) synchronized with the movement of the endless band 10 may be employed to illuminate the portion 42. Such a light source would, of course, be axially displaced from members 22 so as not to interfere with their rotation. More than one such light source may be used for the purpose of producing an enhanced visual effect.

Preferably, an enclosure is provided for the apparatus. The enclosure may have a window in the region of the portion 42 to permit convenient viewing at the viewing station thus provided.

In preparing a belt, synchronization between the text 14 and the information recorded on the magnetic track 16 is easily accomplished by replacing the audio system 50 with a microphone and amplifier system. When each new portion of the endless band 10, acting as a master band, is viewed by a narrator, his reading of the text is recorded. This synchronization is only required of the master band since conventional copying techniques may be employed for any desired number of copies. Further provision is readily made for the insertion of pictures or illustrations of their choice by the child's parents or tutors and for the recording by them of the appropriate sounds or narratives as these pictures or illustrations are being displayed.

It should be noted that the endless bands 10 are easily demounted by lateral displacement to permit substitution of other similar endless bands related to other educational subjects.

While only a single magnetic track 16 is shown on the endless band 10, it is possible to have a plurality of parallel magnetic tracks and provide conventional means for laterally moving the magnetic reproducing head 44 to reproduce the information on any pre-selected magnetic track.

There has thus been shown an improved audio-visual training aid with built-in synchronization between the audio and visual information. The training aid is eminently suitable for retarded and pre-school children since the material may be presented in extended and repeated cycles without requiring the attendance of an operator.

While only one representative embodiment of the invention has been disclosed in detail, there will be obvious to those skilled in the art, many modifications and variations accomplishing the foregoing objects and realizing many or all of the advantages, but which do not depart essentially from the spirit of the invention.

What is claimed is:

1. Audio-visual education apparatus comprising an endless band of a flexible material having accordion-like folds on which are directly disposed pictures and text related to said pictures, a track of magnetically recorded information longitudinally disposed near one edge of said endless band, said magnetically recorded information being related to said pictures and text, a magnetic reproducing head, means for opening the accordion-like folds of said endless band opposite said magnetic reproducing head to operatively position said track with respect to said magnetic reproducing head and to expose said pictures and text for direct visual inspection at a viewing station adjacent said magnetic head, an audio system responsive to said magnetic reproducing head, and means for continuously moving said endless band at constant speed longitudinally past said magnetic reproducing head, said speed being adapted to permit reading said text and viewing said pictures.

2. Audio-visual apparatus comprising a plurality of hinged support members radially extending from an axis, said hinged support members being angularly disposed about said axis, an endless band having visually sensible information directly thereon, said endless band being accordion-like and having a plurality of folds, each of said folds extending radially inward between pairs of said hinged support members, a track of recorded indicia extending longitudinally along said endless band, a transducer for converting the recorded indicia on said track to audibly sensible information, means for rotating said plurality of hinged members about said axis, and means for sequentially separating pairs of said hinged support members to open the associated fold for exposing the visually sensible information to viewing and to position a portion of said track in operative disposition to said transducer.

3. Audio-visual apparatus comprising a plurality of hinged support members radially extending from an axis, said hinged support members being angularly disposed about said axis, an endless band having visually sensible information directly thereon, said endless band being accordion-like and having a plurality of folds, each of said folds extending radially inward between pairs of said hinged support members, a track of magnetically recorded information extending longitudinally along said endless band, a magnetic reproducing head, audio amplifying means responsive to said magnetic reproducing head to convert the magnetically recorded information to audibly sensible information, means for rotating said plurality of hinged support members about said axis, and means for sequentially separating pairs of said hinged support members to open the associated fold for exposing the visually sensible information to viewing and to position a portion of said track in operative disposition to said magnetic reproducing head.

4. Audio-visual apparatus comprising an endless band of flexible material on which are directly disposed pictures and text related to said pictures, said endless band having a plurality of accordion-like folds, a picture and its related text being located on each of said folds, a plurality of hinged support members radially extending from an axis for carrying said endless band, said hinged support members being angularly disposed about said axis, each of said folds extending radially inward between pairs of said hinged support members, a track of magnetically recorded information extending longitudinally along an edge of said endless band, a magnetic reproducing head, audio amplifying means responsive to said magnetic reproducing head to convert the magnetically recorded information to audibly sensible information, means for rotating said plurality of hinged support members about said axis, and means for sequentially separating pairs of said hinged support members to open the associated fold for exposing said pictures and texts to viewing and to operatively position a portion of said track with respect to said magnetic reproducing head.

5. Audio-visual apparatus comprising an endless band of flexible material on which are directly disposed pictures and text related to said pictures, said endless band being a plurality of accordion-like folds, a plurality of hinged support members radially extending from an axis for carrying said endless band, said hinged support members being angularly disposed about said axis, each of said folds extending radially inward between pairs of said hinged support members, a track of magnetically recorded information extending longitudinally along an edge of said endless band, a magnetic reproducing head, audio amplifying means responsive to said magnetic reproducing head to convert the magnetically recorded information to audibly sensible information, a track of holes longitudinally extending along an edge of said endless band, a toothed wheel operatively disposed to engage the holes of said track, means for rotating said toothed wheel, and means for sequentially separating pairs of said hinged support members to open one of said folds for exposing said pictures and text to viewing and to position a portion of said track of magnetically recorded information in operative disposition to said magnetic reproducing head.

6. Audio-visual apparatus comprising an endless band of flexible material on which are directly disposed pictures and text related to said pictures, said endless band being a plurality of accordion-like folds, a plurality of hinge support members radially extending from an axis for carrying said endless band, said hinged support members being angularly disposed about said axis, each of said folds extending radially inward between pairs of said hinged support members, a track of magnetically recorded information extending longitudinally near an edge of said endless band, a magnetic reproducing head, audio amplifying means responsive to said magnetic reproducing head to convert the magnetically recorded information to audibly sensible information, means for rotating said plurality of hinged support members about said axis and first and second spring means radially displaced from said axis, said first spring means being angularly displaced from said second spring means to engage sequential hinged support members to open sequential folds of said endless band for exposing said pictures and text to viewing and to position a portion of said track of magnetically recorded information in operative disposition to said magnetic reproducing head.

7. Audio-visual apparatus comprising an endless band of flexible material on which are directly disposed pictures and text related to said pictures, said endless band being a plurality of accordion-like folds, a plurality of hinged support members radially extending from an axis for carrying said endless band, said hinged support members being angularly disposed about said axis, each of said folds extending radially inward between pairs of said hinged support members, a track of magnetically recorded information extending longitudinally near an edge of said endless band, a magnetic reproducing head, audio amplifying means responsive to said magnetic reproducing head to convert the magnetically recorded information to audibly sensible information, a track of holes longitudinally extending along an edge of said endless band, a toothed wheel operatively disposed to engage the holes of said track, means for rotating said toothed wheel, first and second spring means radially displaced from said axis, said first spring means being angularly displaced from said second spring means to engage sequential hinged support members to open sequential folds of said endless band for exposing said pictures and text to viewing and to position a portion of said track of magnetically recorded information in operative disposition to said magnetic reproducing head.

References Cited in the file of this patent

UNITED STATES PATENTS

| | | |
|---|---|---|
| 636,642 | Dickson | Nov. 7, 1899 |
| 879,691 | Tannehill | Feb. 18, 1908 |
| 1,087,110 | Durand | Feb. 17, 1914 |
| 2,206,134 | Streyckmans | July 2, 1940 |
| 2,521,150 | Chemel | Sept. 5, 1950 |
| 2,543,483 | Barrett | Feb. 27, 1951 |
| 2,637,560 | Smith | May 5, 1953 |
| 2,865,639 | Gillette et al. | Dec. 23, 1958 |

UNITED STATES PATENT OFFICE
CERTIFICATE OF CORRECTION

Patent No. 3,029,683　　　　　　　　　　　　　April 17, 1962

Solomon Zaromb

It is hereby certified that error appears in the above numbered patent requiring correction and that the said Letters Patent should read as corrected below.

In the heading to the printed specification, line 3, for "Solomon Zaromb, 5603 Hilltop Ave., Philadelphia, Pa." read -- Solomon Zaromb, Philadelphia, Pa. (5603 Hilltop Ave., Baltimore 6, Md.) --.

Signed and sealed this 23rd day of October 1962.

(SEAL)
Attest:

ERNEST W. SWIDER
Attesting Officer

DAVID L. LADD
Commissioner of Patents